(12) United States Patent
Zhang et al.

(10) Patent No.: US 10,495,903 B2
(45) Date of Patent: Dec. 3, 2019

(54) DISPLAY SCREEN, GLASSES, DISPLAY SYSTEM AND PLAYING METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yong Zhang, Beijing (CN); Shijun Wang, Beijing (CN); Wenbo Jiang, Beijing (CN); Yanna Xue, Beijing (CN); Yue Li, Beijing (CN); Zhiying Bao, Beijing (CN); Wenjun Xiao, Beijing (CN); Zhenhua Lv, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/508,272

(22) PCT Filed: Jul. 4, 2016

(86) PCT No.: PCT/CN2016/088387
§ 371 (c)(1),
(2) Date: Mar. 2, 2017

(87) PCT Pub. No.: WO2017/128617
PCT Pub. Date: Aug. 3, 2017

(65) Prior Publication Data
US 2018/0321512 A1   Nov. 8, 2018

(30) Foreign Application Priority Data

Jan. 27, 2016  (CN) .......................... 2016 1 0055266

(51) Int. Cl.
*G02C 7/08* (2006.01)
*G09G 5/00* (2006.01)
(Continued)

(52) U.S. Cl.
CPC ....... *G02C 7/083* (2013.01); *G02F 1/134336* (2013.01); *G02F 1/3555* (2013.01);
(Continued)

(58) Field of Classification Search
CPC ...................................................... G02C 7/083
See application file for complete search history.

(56) References Cited

U.S. PATENT DOCUMENTS

| | | | | |
|---|---|---|---|---|
| 5,563,621 A | * | 10/1996 | Silsby | ............... G02F 1/133621 345/43 |
| 2003/0133569 A1 | * | 7/2003 | Stern | ...................... G06F 21/84 380/206 |

(Continued)

FOREIGN PATENT DOCUMENTS

| | | |
|---|---|---|
| CN | 101635017 A | 1/2010 |
| CN | 102053809 A | 5/2011 |

(Continued)

OTHER PUBLICATIONS

1$^{St}$ Chinese Office Action, English Translation.
(Continued)

*Primary Examiner* — Phi Hoang
(74) *Attorney, Agent, or Firm* — Brooks Kushman P.C.

(57) ABSTRACT

A display screen, a pair of glasses, a display system and a playing method are provided. The display screen includes a display control module and a display panel. The display control module controls the display panel to display multiple frames of images according to multiple predetermined playing codes. Each playing code corresponds to one frame of image. Each frame of image is displayed as normal image or
(Continued)

interference image based on different logic values of the corresponding playing code. The multiple frames of images are divided into multiple consecutive frame groups. The quantity of consecutive frames corresponding to playing codes having an identical logic value in each frame group is not larger than a predetermined value, such that a user wearing glasses matching the display screen can see the normal images displayed on the display panel and cannot see the interference images displayed on the display panel.

14 Claims, 3 Drawing Sheets

(51) Int. Cl.
*G02F 1/1343* (2006.01)
*G02F 1/355* (2006.01)
*H04N 13/341* (2018.01)
*H04N 13/30* (2018.01)

(52) U.S. Cl.
CPC ............ *G09G 5/00* (2013.01); *H04N 13/341* (2018.05); *H04N 2013/403* (2018.05)

(56) References Cited

U.S. PATENT DOCUMENTS

| | | | |
|---|---|---|---|
| 2010/0079676 A1* | 4/2010 | Kritt | G06F 3/1431 348/598 |
| 2011/0221981 A1* | 9/2011 | Tanaka | G02F 1/13471 349/13 |
| 2011/0222559 A1 | 9/2011 | Ishii et al. | |
| 2012/0050509 A1 | 3/2012 | Suzuki | |
| 2012/0120075 A1 | 5/2012 | Iijima | |
| 2012/0190439 A1* | 7/2012 | Nourbakhsh | G02B 27/2264 463/31 |
| 2012/0206569 A1* | 8/2012 | Verdier | G06T 3/4007 348/43 |
| 2013/0050189 A1 | 2/2013 | Tseng et al. | |
| 2014/0320556 A1* | 10/2014 | Fang | G02B 27/2228 345/691 |
| 2015/0379911 A1 | 12/2015 | Chen et al. | |
| 2016/0034048 A1* | 2/2016 | Tanaka | G06F 3/0304 345/158 |
| 2016/0080733 A1* | 3/2016 | Kim | H04N 13/383 348/56 |

FOREIGN PATENT DOCUMENTS

| | | |
|---|---|---|
| CN | 102239696 A | 11/2011 |
| CN | 102387380 A | 3/2012 |
| CN | 102469336 A | 5/2012 |
| CN | 102523460 A | 6/2012 |
| CN | 102779500 A | 11/2012 |
| CN | 102970551 A | 3/2013 |
| CN | 104134282 A | 11/2014 |
| CN | 104866267 A | 8/2015 |
| CN | 105657409 A | 6/2016 |
| EP | 2710581 A1 | 3/2014 |
| WO | 2012155983 A1 | 11/2012 |

OTHER PUBLICATIONS

International Search Report and Written Opinion, English Translation.
CN101635017A, English Abstract and Translation.
CN102053809A, English Abstract and Translation.
CN102239696A, English Abstract and U.S. Equivalent U.S. Pub. No. 2011/0222559.
CN102469336A, English Abstract and U.S. Equivalent U.S. Pub. No. 2012/0120075.
CN102523460A, English Abstract and Translation.
CN102779500A, English Abstract and Translation.
CN102970551A, English Abstract and U.S. Equivalent U.S. Pub. No. 2013/0050189.
CN104134282A, English Abstract and U.S. Equivalent U.S. Pub. No. 2015/0379911.
CN105657409A, English Abstract and Translation.
EP2710581A1, Equivalent PCT Pub. No. WO 2012/155983.
Third Office Action for Chinese Application No. 201610055266.5, dated Apr. 27, 2018, 11 Pages.
First Office Action for Chinese Application No. 201610055266.5, dated Apr. 18, 2017, 9 Pages.
International Search Report and Written Opinion for Application No. PCT/CN2016/088387, dated Oct. 27, 2016, 12 Pages.
Second Office Action for Chinese Application No. 201610055266.5, dated Sep. 21, 2017, 7 Pages.
$3^{rd}$ Chinese Office Action, English Translation.
CN102387380A, English Abstract and U.S. Equivalent U.S. Pub. No. 2012/0050509.

* cited by examiner

Fig. 3 a correspondence between an M-th row to an N-th row of strip-like electrodes of the pair of liquid crystal glasses and a first row to a last row of pixels of the display panel is established, where the M-th row of strip-like electrode corresponds to the first row of pixels, and the N-th row of strip-like electrode corresponds to the last row of pixels — 401 multiple frames of images are displayed by the display screen according to predetermined multiple playing codes, and the pair of glasses is controlled to be in a light transmitting state or a light shielding state according to the logic values of the respective playing codes — 402

DISPLAY SCREEN, GLASSES, DISPLAY SYSTEM AND PLAYING METHOD

CROSS-REFERENCE TO RELATED APPLICATION APPLICATIONS

This application is the U.S. national phase of PCT Application No. PCT/CN2016/088387 filed on Jul. 4, 2016, which claims priority to Chinese Patent Application No. 201610055266.5 filed on Jan. 27, 2016, the disclosures of which are incorporated in their entirety by reference herein.

TECHNICAL FIELD

The present disclosure relates to the technical field of liquid crystal display, and in particular to a display screen, a pair of glasses, a display system and a playing method.

BACKGROUND

At present, there are two methods for achieving confidential display. One method is based on a switchable viewing angle. In this method, a display may be switched between a wide viewing angle mode and a narrow viewing angle mode. When the display operates in the narrow viewing angle mode, only persons within a certain viewing angle range can see displayed content while persons beyond the certain viewing angle range cannot see the displayed content, thereby achieving the confidential display. Such method is defective on account of narrow observing range and poor confidentiality. The other method is to use special glasses. In related technology, liquid crystal glasses are utilized, and a four-pole double-throw electronic switch is controlled to send antiphase signals and inphase signals to the screen in a time-division manner. The antiphase signals and the inphase signals are sent alternately, or each time the antiphase signal may be sent with a probability of 50% and the inphase signal may be sent with a probability of 50%. The liquid crystal glasses are connected to the electronic switch, and are switched on when the inphase signals are sent to the screen and switched off when the antiphase signals are sent to the screen. The above method using the liquid crystal glasses is defective for the following reasons: in the case that each time the antiphase signal may be sent with a probability of 50% and the inphase signal may be sent with a probability of 50%, consecutive frames of antiphase or inphase signals may occur and then the liquid crystal glasses may be switched on or off during time corresponding to the consecutive frames; as a result, a frequency of a video signal observed by a person may be decreased and image flickering may occur.

SUMMARY

In view of this, a display screen, a pair of glasses, a display system and a playing method are provided, so as to improve display effect of confidential display.

In one aspect, a display screen is provided, including a display control module and a display panel. The display control module is used to control the display panel to display multiple frames of images successively according to multiple predetermined playing codes. Each playing code corresponds to one frame of image, and each frame of image is displayed as a normal image or an interference image based on different logic values of the corresponding playing code. The multiple frames of images are divided into multiple consecutive frame groups, and the quantity of consecutive frames of images corresponding to playing codes having an identical logic value in each frame group is not larger than a predetermined value, to enable a user wearing a pair of glasses matching the display screen to see the normal images displayed on the display panel and disenable the user wearing the pair of glasses matching the display screen to see the interference images displayed on the display panel.

Optionally, the playing codes corresponding to any two consecutive frames in each frame group have different logic values.

Optionally, quantities of frames of images in respective frame groups are identical.

Optionally, the logic value of each playing code is a binary code.

Optionally, each frame group corresponds to one frame group code, and each frame group code corresponds to a predetermined sequence of the logic values of the playing codes corresponding to respective frames of images in the frame group corresponding to the frame group code.

In another aspect, a pair of glasses is further provided in the present disclosure, including a switch control module used to control the pair of glasses to switch between a light transmitting state and a light shielding state according to logic values of predetermined playing codes of multiple frames of images.

Optionally, the pair of glasses is a pair of liquid crystal glasses including a first substrate, a second substrate and a liquid crystal layer between the first and the second substrates, and multiple horizontal strip-like electrodes are arranged on the second substrate.

Optionally, the strip-like electrodes are made of a conductive glass.

In addition, a display system is further provided in the present disclosure, including the display screen and the pair of glasses hereinabove, where the pair of glasses is in the light transmitting state in the case that the display panel displays the normal image and in the light shielding state in the case that the display panel displays the interference image.

Optionally, the pair of glasses is a pair of liquid crystal glasses including a first substrate, a second substrate and a liquid crystal layer between the first and the second substrates. Multiple horizontal strip-like electrodes are arranged on the second substrate, and the quantity of the strip-like electrodes is not smaller than the quantity of rows of pixels of the display panel.

Optionally, the pair of glasses is provided with one of a locating signal generator and a locating signal receiver, and the display screen is provided with the other of the locating signal generator and the locating signal receiver, to enable the display screen to determine a location of the pair of glasses based on a locating signal, and to control the pair of glasses to be in the light shielding state when it is detected that a distance between the pair of glasses and the display screen is larger than a predetermined value.

Optionally, the locating signal generator is an ultrasonic generator and the locating signal receiver is an ultrasonic receiver.

Optionally, the strip-like electrodes are made of a conductive glass.

In addition, a playing method is further provided in the present disclosure, including: displaying, by a display panel of a display screen, multiple frames of images according to multiple playing codes, where each playing code corresponds to one frame of image, and each frame of image is displayed as a normal image or an interference image based on different logic values of the corresponding playing code;

and controlling a pair of glasses to be in a light transmitting state or a light shielding state according to the logic values of respective playing codes, to enable a user wearing the pair of glasses to see the display screen in the case that the display panel displays the normal image and disenable the user wearing the pair of glasses to see the display screen in the case that the display panel displays the interference image.

Optionally, the pair of glasses is a pair of liquid crystal glasses. Prior to the step of controlling the pair of glasses to be in the light transmitting state or the light shielding state according to the logic values of the respective playing codes, the method further includes: establishing a correspondence between an M-th row to an N-th row of strip-like electrodes of the pair of liquid crystal glasses and a first row to a last row of pixels of the display panel, where the M-th row of strip-like electrode of the pair of liquid crystal glasses corresponds to the first row of pixels of the display panel, and the N-th row of strip-like electrode of the pair of liquid crystal glasses corresponds to the last row of pixels of the display panel. The step of controlling the pair of glasses to be in the light transmitting state or the light shielding state according to the logic values of the respective playing codes includes: switching on corresponding rows of strip-like electrodes of the pair of liquid crystal glasses based on the logic values of the respective playing codes, where the strip-like electrode corresponding to each row of pixels of the display panel is switched on in the case that the display panel displays the normal image and the row of pixels is being scanned.

From the above, with the display screen, the pair of glasses, the display system and the playing method in the present disclosure, the user wearing the glasses matching the display screen is able to see the normal images displayed on the display panel, while the user who does not wear the glasses matching the display screen may see flickering images, thereby achieving the confidential display. In addition, the quantity of consecutive frames of normal images and the quantity of consecutive frames of interference images are both not larger than a predetermined value, such that the confidential effect of the display screen is achieved without lowering the frequency of the video signal seen by the user wearing the glasses matching the display screen, thereby improving the display effect. In comparison with the manner of switchable viewing angle, the observer is able to see the displayed confidential content in a wide range by the embodiments of the present disclosure. The display system in the embodiments of the present disclosure achieves a one-to-one correspondence of the display screen and the pair of glasses, thereby achieving high confidentiality. According to the present disclosure, it is merely required to predetermine the logic values of a sequence of frame group codes or the logic values of the playing codes of multiple frames of images, and it is able to control the liquid crystal glasses to be in a light transmitting state or a light shielding state in a wireless manner, which is easy to use. The quantity of consecutive frames of images corresponding to playing codes having an identical logic value in each frame group is not larger than a predetermined value; therefore, the displayed images may not flicker and the display effect is enhanced. In addition, according to the embodiments of the present disclosure, multiple consecutive frames of images are combined as one frame group, the frame group code of each frame group corresponds to a predetermined sequence of logic values of playing codes corresponding to respective frames of images in the frame group, so that it is merely required to predetermine the logic values of the sequence of frame group codes and the sequence of the logic values of the playing codes of the respective frames of images corresponding to each frame group code, thereby significantly reducing the quantity of the playing codes to be predetermined and simplifying the control. The strip-like electrodes in the glasses in the present disclosure may be made of a conductive glass, data is written into the strip-like electrodes of the glasses downwardly, and the data writing process of the glasses is synchronized with a data writing process of the liquid crystal display screen, thereby achieving synchronization of the liquid crystal glasses and the liquid crystal display screen.

DETAILED DESCRIPTION

In order to make the technical solutions and the advantages of the present disclosure more apparent, the present disclosure will be described hereinafter in details in conjunction with the drawings and embodiments.

Figure 1:
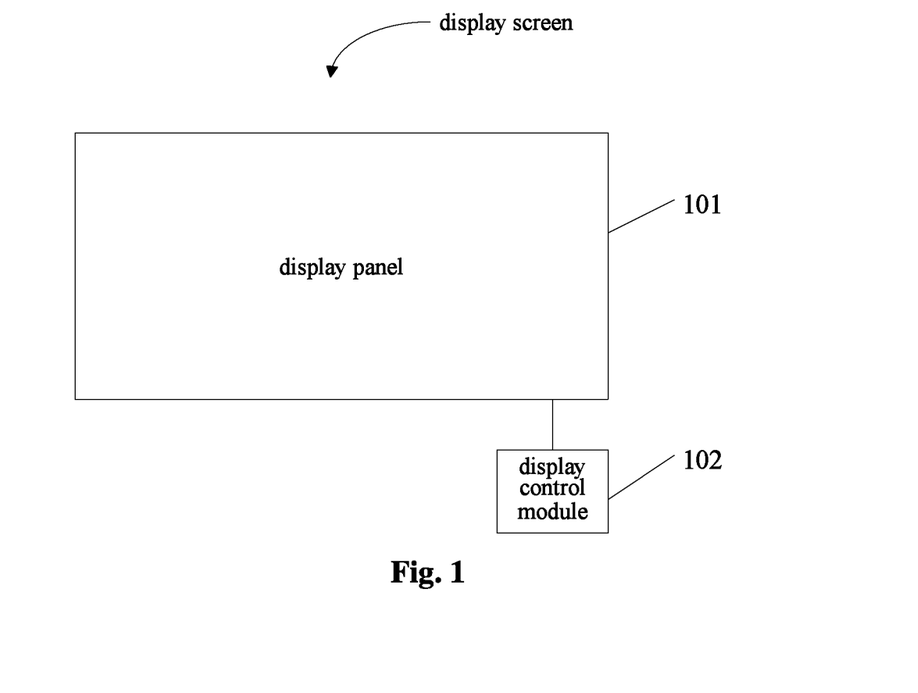
FIG. 1 is a schematic structural view of a display screen according to some embodiments of the present disclosure.

A display screen is provided in some embodiments of the present disclosure. As shown in FIG. 1, the display screen includes a display panel 101 and a display control module 102. The display control module 102 is connected to the display panel 101 and configured to control the display panel 101 to display normal images or interference images. The display control module is configured to control the display screen to display multiple frames of images successively according to predetermined multiple playing codes. Each playing code corresponds to one frame of image, and each frame of image is displayed as the normal image or the interference image based on different logic values of the corresponding playing code. The multiple frames of images are divided into multiple consecutive frame groups, and the quantity of consecutive frames of images corresponding to playing codes having an identical logic value in each frame group is not larger than a predetermined value. By wearing glasses matching the display screen, a user can see the normal images displayed on the display panel and cannot see the interference images displayed on the display panel.

The user may wear glasses matching the display screen. The glasses are in a light transmitting state in the case that the display panel displays the normal image, so that the user can see the normal image. The glasses are in a light shielding state in the case that the display panel displays the interference image, so that the user cannot see the interference image. Due to the persistence of vision of human eyes, the user wearing the glasses matching the display screen can see the normal images.

From the above, the display screen in the present disclosure may achieve confidential display in a wireless manner. The quantity of consecutive frames of images corresponding to playing codes having an identical logic value in each frame group is not larger than the predetermined value; therefore, during time of the persistence of vision of human eyes, the user wearing the glasses matching the display screen can see the normal images without adverse effects such as image flickering. A user who does not wear the glasses matching the display screen cannot see the normal images, thereby guaranteeing the confidentiality of the display screen.

In some embodiments of the present disclosure, the predetermined value is determined based on a display frequency of the display screen and a flickering frequency of human eyes. The display frequency of a common display screen is 60 Hz. The flickering frequency of human eyes is 24 frames; that is, a user can see 24 frames of images per second. If the user sees less than 24 frames of images per second, the images may seem to be unsmooth. Therefore, based on the display frequency of the common display screen and the flickering frequency of human eyes, the quantity of consecutive frames of normal images shall be smaller than the quotient of 60 and 24, i.e., 2.5 in order to guarantee that the user who does not wear the glasses matching the display screen cannot see the normal images. Meanwhile, the quantity of consecutive frames of interference images shall be smaller than 2.5 in order to guarantee that the user wearing the glasses matching the display screen may not be disturbed by image flickering.

In some embodiments of the present disclosure, playing codes corresponding to any two consecutive frames in each frame group have different logic values, so the display quality may be further improved and setting and recognition of playing codes are convenient.

In some embodiments of the present disclosure, quantities of frames of images in respective frame groups are identical.

In some embodiments of the present disclosure, the logic values of the playing codes are binary codes.

In some embodiments of the present disclosure, each frame group corresponds to one frame group code. The frame group code may be a single-digit number and may be predetermined. In some embodiments of the present disclosure, the frame group code may be a binary-coded decimal (BCD) code, and the confidentiality may be improved by increasing bit of the BCD code. For example, "000111" corresponds to 6 frame groups, and "0", "0", "0", "1", "1", "1" are the frame group codes of the 6 frame groups respectively. In some embodiments of the present disclosure, a sequence of frame group codes serves as a cipher of the display screen, and a value of each frame group code in the sequence of frame group codes corresponds to a predetermined sequence of the logic values of the playing codes corresponding to respective frames of images in the frame group corresponding to the frame group code. For example, each frame group includes six frames of images. For a frame group with a frame group code of "0", a sequence of logic values of playing codes corresponding to the frames of images in the frame group is "010101"; and for a frame group with a frame group code of "1", a sequence of logic values of playing codes corresponding to the frames of images in the frame group is "101010". In the case that the logic value "0" represents to display the normal image and the logic value "1" represents to display the interference image, the frames of images in the frame group with the frame group code "0" are displayed as, in sequence, the normal image, the interference image, the normal image, the interference image, the normal image and the interference image; meanwhile, the glasses matching the display screen are switched into the light transmitting state, the light shielding state, the light transmitting state, the light shielding state, the light transmitting state and the light shielding state sequentially. It is unable to acquire the sequence of switching the glasses between the light transmitting state and the light shielding state in case of unaware of the sequence of the frame group codes, so the sequence of frame group codes may serve as the cipher of the display screen and the display screen may achieve a confidential display. In some embodiments of the present disclosure, optionally, it may be set that the logic value "1" represents to display the normal image and the logic value "0" represents to display the interference image.

According to the above manner, in a frame control signal, two consecutive bits of "0" or "1" may occur in every 6 frames, and then the user who wears liquid crystal glasses having a cipher in accordance with the cipher of the display screen may see two consecutive frames of original images or all-black images in every 6 frames. Therefore, image flickering may be well solved as long as the frame frequency is doubled. In addition, it is merely required to predetermine the logic values of the sequence of frame group codes and the logic values of the sequence of playing codes of multiple frames of images corresponding to each frame group code, thereby significantly reducing the quantity of playing codes to be predetermined and simplifying the control. It is merely required in the present disclosure that response time of a liquid crystal display screen is smaller than or equal to 10 ms, which can be achieved by the mainstream liquid crystal display screens at present. A video signal of 60 Hz, after a double-frequency process, is turned into a video signal of 120 Hz, i.e., 60 frames of images are to be displayed within 0.5 s. The 60 frames of images include 10 frame groups each including 6 frames of images. If a random cipher is input for the liquid crystal glasses, a probability that the liquid crystal glasses are in the light transmitting state or the light shielding state correctly during one frame group is ½, and then probabilities of seeing all frames of normal images during 0.5 s and during 1 s are 1/1024 and 1/(1024×1024) respectively.

In some embodiments of the present disclosure, each frame group may optionally include less than 6 frames of images or more than 6 frames of images.

In some embodiments of the present disclosure, in the case that the display screen has such a higher frequency that the user wearing the glasses is unable to see 3 frames or less than 3 frames of consecutive interference images, the frame group code may be a code other than the BCD code, e.g., the frame group code may be a decimal code. In the case that the frame group code is a decimal code, each of 0 to 9 corresponds to one predetermined logic value sequence. Considering the display frequency of the common display screen in the related technology, it is feasible that two consecutive and identical logic values exist in the logic value sequence corresponding to each frame group code, so as to provide more options for the logic value sequence. For example, for a frame group with a frame group code of "0", a sequence of logic values of playing codes corresponding to frames of images in the frame group is "001010"; for a frame group with a frame group code of "1", a sequence of logic values of playing codes corresponding to frames of images in the frame group is "10010"; for a frame group with a frame group code of "2", a sequence of logic values of playing codes corresponding to frames of images in the frame group is "101001". The logic value sequence corresponding to each frame group code may be set based on a principle that the quantity of identical and consecutive logic values is not larger than 2. For example, it is not allowed to have three or more than three consecutive "1" or three or more than three consecutive "0" in the logic value sequence corresponding to each frame group code.

In some embodiments of the present disclosure, the logic value sequence corresponding to each frame group code may be set based on a certain principle such that the user who does not wear the glasses matching the display screen is unable to see the normal images on the display screen and the normal images seen by the user wearing the glasses matching the display screen may not flicker.

For the common display screen, it is merely required that the quantity of the consecutive frames of normal images or interference images is not larger than 2, in order to guarantee that the user who does not wear the glasses is unable to see the normal images and the user wearing the glasses is unable to see the interference images.

When the display screen in the embodiments of the present disclosure displays the normal images and the interference images, the displayed frames of images are divided into frame groups, and the sequence of frame group codes is set as the cipher of the display screen. The user wearing the glasses is able to see the normal images, only when the user set a correct cipher for the glasses to make the glasses to be in the light transmitting state when the display panel displays the normal images and in the light shielding state when the display panel displays the interference images. The sequence of the frame group codes is set as the cipher of the display screen, and only in the case that the cipher set for the glasses is in accordance with the cipher of the display screen, the glasses can be switched between the light transmitting state and the light shielding state according to a sequence of the normal images and the interference images displayed by the display panel of the display screen, so that the user wearing the glasses can see the normal images. In the case that the cipher set for the glasses is not in accordance with the cipher of the display screen, the user wearing the glasses may only see flickering images rather than the normal images. It should be noted that, the cipher set for the glasses refers to a code sequence for controlling the glasses to be in the light transmitting state and the light shielding state. For example, the code sequence may be "010101101010", where "0" represents the light transmitting state and "1" represents the light shielding state. The cipher set for the display screen refers to the sequence of the frame group codes, such as "01", and each frame group code corresponds to a sequence of playing codes of 6 frames of images. For example, a sequence of playing codes of 6 frames of images corresponding to the frame group code "0" is "010101", a sequence of playing codes of 6 frames of images corresponding to the frame group code "1" is "101010", where the playing code "0" represents to display the normal image and the playing code "1" represents to display the interference image. Therefore, a sequence of playing codes of frames of images corresponding to a cipher "01" set for the display screen is "010101101010". It can be seen from the above, a code sequence "010101101010" serving as the cipher of the glasses is in accordance with the code sequence "01" serving as the cipher of the display screen. That is, the code sequence serving as the cipher of the glasses is identical to the sequence of playing codes of the frames of images corresponding to the code sequence serving as the cipher of the display screen, both are "010101101010".

In some embodiments of the present disclosure, the interference images may be identical or different.

Furthermore, a pair of glasses is provided in some embodiments of the present disclosure, including a switch control module. The switch control module is used to control the pair of glasses to be in a light transmitting state and a light shielding state based on logic values of predetermined playing codes, such that the user wearing the pair of glasses is able to see normal images displayed on a display panel and unable to see interference images displayed on the display panel.

The pair of glasses in the embodiments of the present disclosure can match the display screen in the foregoing embodiments, such that the user wearing the pair of glasses is able to see the normal images displayed on the display panel, thereby achieving confidential display.

Figure 2:
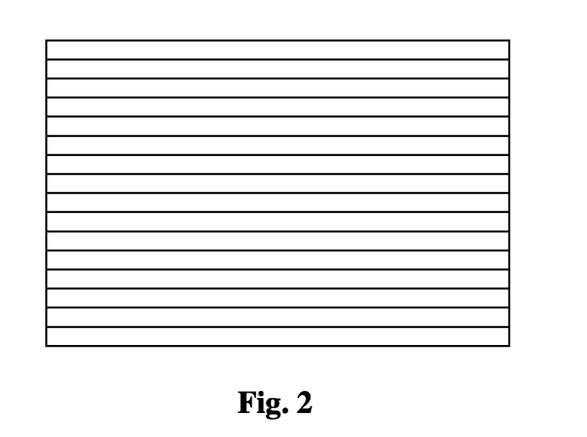
FIG. 2 is a schematic view of strip-like electrodes of liquid crystal glasses according to some embodiments of the present disclosure.

In some embodiments of the present disclosure, the pair of glasses is a pair of liquid crystal glasses including a first substrate, a second substrate and a liquid crystal layer between the first and the second substrates. Multiple horizontal strip-like electrodes are arranged on the second substrate. As shown in FIG. 2, the strip-like electrodes in use are arranged horizontally, and the pair of liquid crystal glasses displays images in a manner of progressive scanning.

Figure 5A:
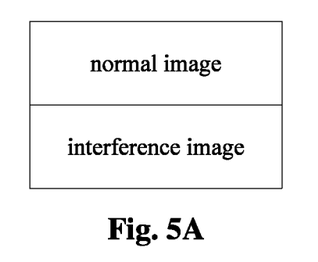
FIGS. 5A and 5B are schematic views showing a display status of a display screen according to some embodiments of the present disclosure.
Figure 5B:
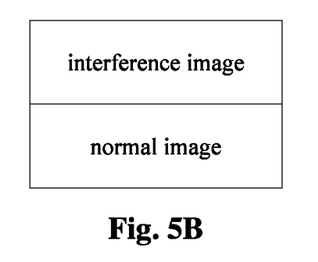

In order that the user wearing the pair of liquid crystal glasses is able to see the normal images, the liquid crystal display panel and the pair of liquid crystal glasses work synchronously. Rows of pixels of the display panel are scanned from a top row of pixels to a bottom row of pixels to write data. When a certain row of pixels is being scanned, all rows of pixels above the cretin row of pixels and all rows of pixels below the cretin row of pixels display two adjacent frames of images, which are an original image and an inverse image of the original image, as shown in FIG. 5A or FIG. 5B. In order synchronize the liquid crystal display panel and the pair of liquid crystal glasses, strip-like electrodes shown in FIG. 2 are formed on the second substrate of the pair of liquid crystal glasses. In addition, the pair of liquid crystal glasses may determine a location of the liquid crystal display screen based on a signal sent by the liquid crystal display screen. Based on the location of the liquid crystal display screen, it is determined that the user sees a first row of pixels of the liquid crystal display panel through an M-th row of strip-like electrode of the pair of liquid crystal glasses, and sees a last row of pixels of the liquid crystal display panel through an N-th row of strip-like electrode of the pair of liquid crystal glasses. In response to a frame synchronization signal sent by the liquid crystal display screen, data is written to the pair of liquid crystal glasses from the M-th row of strip-like electrode to the N-th row of strip-like electrode downwardly and the data writing process of the pair of liquid crystal glasses is synchronized with a data writing process of the liquid crystal display panel, where the quantity of rows of pixels of the liquid crystal display panel is equal to N−M+1. In the case that a value of a playing code corresponding to a certain frame is 0, data of an original image is written into the liquid crystal display panel from the top row of pixels to the bottom row of pixels, and correspondingly, data enabling the pair of liquid crystal glasses to be in the light transmitting state is written into the pair of liquid crystal glasses downwardly. In the case that a value of a playing code corresponding to a certain frame is 1, data of an inverse image of the original image is written into the display panel from the top row of pixels to the bottom row of pixels, and correspondingly, data enabling the pair of liquid crystal glasses to be in the light shielding state is written into the pair of liquid crystal glasses downwardly. In the case that the frame frequency of the display screen is XHz, a scanning frequency of the pair of liquid crystal glasses is X*(N−M+1) Hz. The eyes of the observer may be located by locating the head of the observer through binocular parallax auto-stereoscopic display, that is, an ultrasonic generator is arranged on the pair of liquid crystal glasses, and an ultrasonic receiver is arranged on the display screen to locate the head of the observer through the ultrasonic from the ultrasonic generator, so as to locate the eyes of the observer.

Figure 3:
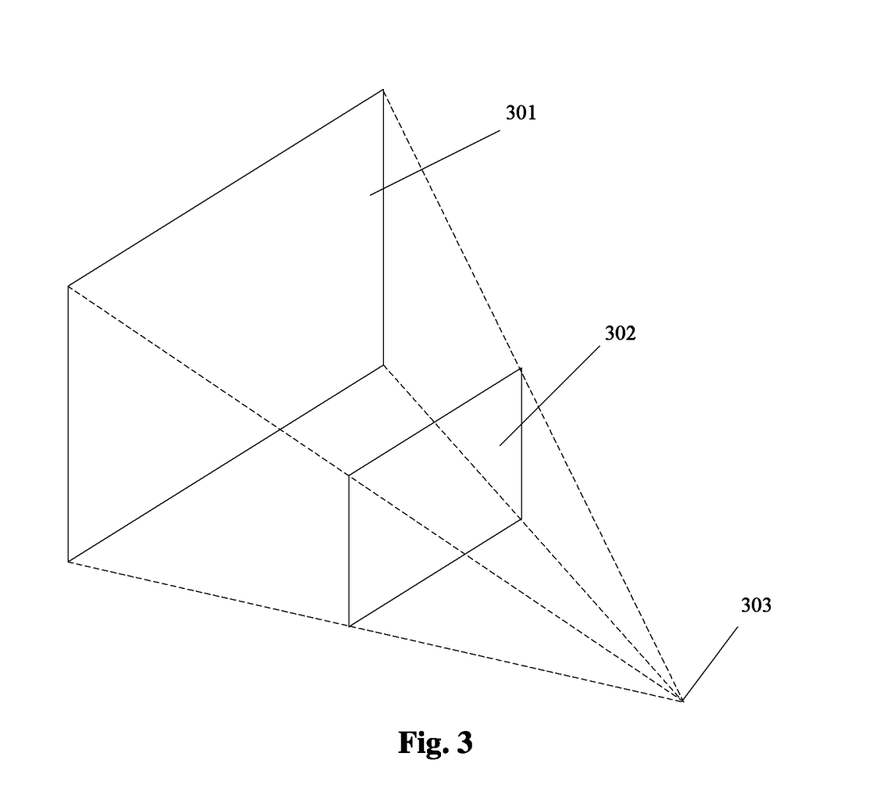
FIG. 3 is a schematic view of a display system according to some embodiments of the present disclosure.

Furthermore, a display system as shown in FIG. 3 is provided in the present disclosure, including the display panel 301 of the display screen according to any foregoing embodiment and the pair of glasses 302 according to any foregoing embodiment.

The pair of glasses 302 is switched between a light transmitting state and a light shielding state according to logic values of multiple playing codes. The pair of glasses 302 is in the light transmitting state in the case that the display panel 301 displays the normal image and is in the light shielding state in the case that the display panel 301 displays the interference image, such that human eyes 303 can see the normal images when the observer wears the pair of glasses 302.

The display system provided in the present disclosure may achieve the confidential display. The user wearing the glasses matching the display screen is able to see the normal images displayed on the display panel, while the user who does not wear the glasses matching the display screen see flickering images, thereby guaranteeing the confidentiality of the normal images.

In some embodiments of the present disclosure, a first sequence of BCD codes is set as a cipher of the liquid crystal display screen. Each BCD code in the first sequence of BCD codes corresponds to a sequence of logic values of playing codes corresponding to multiple frames of images. The display screen displays a normal original image in the case that the logic value of a certain playing code is 0, and displays an inverse image of the original image in the case that the logic value of a certain playing code is 1. Moreover, a second sequence of BCD codes is further set as a cipher of the liquid crystal glasses and stored in a storage of the liquid crystal glasses. Respective bits of the second sequence of BCD codes, from a starting bit to an end bit of the second sequence, control the liquid crystal glasses to be in the light transmitting state and the light shielding state. The liquid crystal glasses are in the light transmitting state in the case that the logic value of a certain bit of the second sequence of BCD codes is 0, and are in the light shielding state in the case that the logic value of a certain bit of the second sequence of BCD codes is 1. Only when the cipher of the liquid crystal glasses is in accordance with the cipher of the display screen, the liquid crystal glasses may be in the light transmitting state in the case that the display panel displays the original image and in the light shielding state in the case that the display panel displays the inverse image of the original image. Due to visual inertia of human eyes, the observer is able to see the normal images in the case that the frame frequency is higher than a critical flickering frequency of human eyes. In the case that the cipher of the pair of liquid crystal glasses is not in accordance with the cipher of the display screen, based on probability theory, a probability of seeing the original image by the observer is identical to a probability of seeing the inverse image of the original image by the observer, and then the observer these flickering images rather than the normal images.

In some embodiments of the present disclosure, the pair of glasses is a pair of liquid crystal glasses including a first substrate, a second substrate and a liquid crystal layer between the first and the second substrates. Multiple horizontal strip-like electrodes are arranged on the second substrate. The quantity of the strip-like electrodes of the pair of glasses is not smaller than the quantity of rows of pixels of the display panel. In some embodiments of the present disclosure, the pair of glasses, through the strip-like electrodes, achieves the progressive scanning synchronized with the display panel.

In some embodiments of the present disclosure, the glasses are provided with one of a locating signal generator and a locating signal receiver, and the display screen is provided with the other one of the locating signal generator and the locating signal receiver, so that the display screen is able to determine the location of the glasses based on a locating signal, and the glasses are controlled to be in the light shielding state when it is detected that a distance between the glasses and the display screen is larger than a predetermined value.

In some embodiments of the present disclosure, the locating signal generator is an ultrasonic generator, and the locating signal receiver is an ultrasonic receiver.

Figure 4:
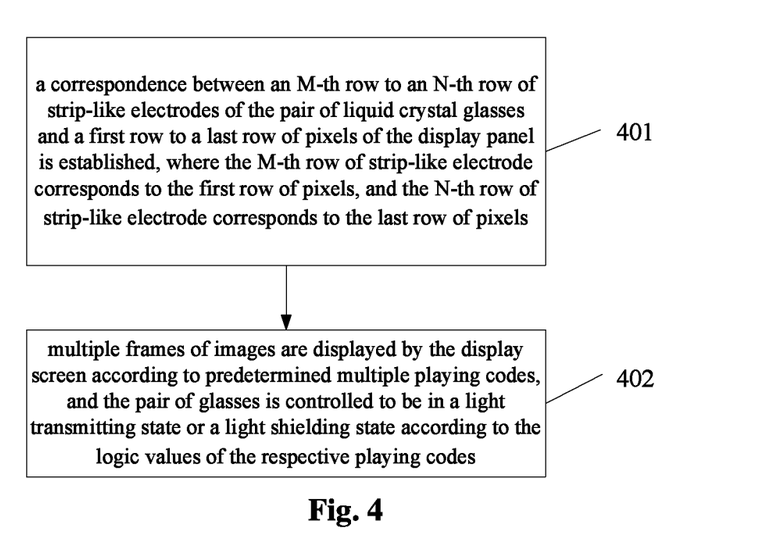
FIG. 4 is a flow chart of a playing method according to some embodiments of the present disclosure.

Furthermore, a playing method is provided in the present disclosure, including steps shown in FIG. 4.

In step 402, multiple frames of images are displayed by a display panel of a display screen according to predetermined multiple playing codes, where each playing code corresponds to one frame of image, and each frame of image is displayed as a normal image or an interference image based on different logic values of the corresponding playing code; and a pair of glasses is controlled to be in a light transmitting state or a light shielding state according to the logic values of the respective playing codes, to enable a user wearing the pair of glasses to see the display screen in the case that the display panel displays the normal images and disenable the user wearing the pair of glasses to see the display screen in the case that the display panel displays the interference images.

In some embodiments of the present disclosure, as shown in FIG. 4, the pair of glasses is a pair of liquid crystal glasses, and prior to the step of controlling the pair of glasses to be in the light transmitting state or the light shielding state according to the logic values of the respective playing codes, the method further includes step 401.

In step 401, a correspondence between an M-th row to an N-th row of strip-like electrodes of the pair of liquid crystal glasses and a first row to a last row of pixels of the display panel is established, where the M-th row of strip-like electrode of the pair of liquid crystal glasses corresponds to the first row of pixels of the display panel, and the N-th row of strip-like electrode of the pair of liquid crystal glasses corresponds to the last row of pixels of the display panel.

The step of controlling the pair of glasses to be in the light transmitting state or the light shielding state according to the logic values of respective playing codes includes: switching on corresponding rows of strip-like electrodes of the pair of liquid crystal glasses based on the logic values of respective playing codes, where the strip-like electrode corresponding to each row of pixels of the display panel is switched on in the case that the display panel displays the normal image and the row of pixels is being scanned.

By synchronizing the pair of glasses and the display panel, the M-th row of strip-like electrode of the pair of liquid crystal glasses may be switched on in the case that the display panel displays the normal image and the first row of pixels of the display panel is being scanned, the (M+1)-th row of strip-like electrode of the pair of liquid crystal glasses may be switched on in the case that the display panel displays the normal image and the second row of pixels of the display panel is being scanned, . . . , and the N-th row of strip-like electrode of the pair of liquid crystal glasses may be switched on in the case that the display panel displays the normal image and the last row of pixels of the display panel is being scanned. Because the quantity of the strip-like electrodes of the pair of liquid crystal glasses is larger than the quantity of the rows of pixels of the display panel, the pair of liquid crystal glasses may match the rows of pixels of the display panel at various locations.

From the above, with the display screen, the pair of glasses, the display system and the playing method in the present disclosure, the user wearing the glasses matching the display screen is able to see the normal images displayed on the display panel, while the user who does not wear the glasses matching the display screen may see flickering images, thereby achieving the confidential display. In addition, the quantity of consecutive frames of normal images and the quantity of consecutive frames of interference images are both not larger than a predetermined value, such that the confidential effect of the display screen is achieved without lowering the frequency of the video signal seen by the user wearing the glasses matching the display screen, thereby improving the display effect. In comparison with the manner of switchable viewing angle, the observer is able to see the displayed confidential content in a wide range by the embodiments of the present disclosure. The display system in the embodiments of the present disclosure achieves a one-to-one correspondence of the display screen and the pair of glasses, thereby achieving high confidentiality. According to the present disclosure, it is merely required to predetermine the logic values of a sequence of frame group codes or the logic values of the playing codes of multiple frames of images, and it is able to control the liquid crystal glasses to be in a light transmitting state or a light shielding state in a wireless manner, which is easy to use. In addition, according to the embodiments of the present disclosure, multiple consecutive frames of images are combined as one frame group, and it is able to control, through the one-digit frame group code, the display statuses of respective frames in each frame group and the light transmitting or shielding statuses of the liquid crystal glasses, thereby avoiding the image flickering. The strip-like electrodes in the glasses in the present disclosure may be made of a conductive glass, data is written into the strip-like electrodes of the glasses downwardly, and the data writing process of the glasses is synchronized with a data writing process of the liquid crystal display screen, thereby achieving synchronization of the liquid crystal glasses and the liquid crystal display screen.

It should be appreciated that, the above embodiments are for illustrative purposes only, but shall not be used to limit the scope of the present disclosure, and the embodiments and the features thereof may be combined in the case of no conflict.

Obviously, a person skilled in the art may make further modifications and improvements without departing from the principle of the present disclosure, and these modifications and improvements shall also fall within the scope of the present disclosure.

What is claimed is:

1. A display system, comprising a display screen and a pair of glasses,
    wherein the display screen comprises a display control circuit and a display panel, wherein the display control circuit is configured to control the display panel to display a plurality of frames of images successively according to a plurality of playing codes that is predetermined;
    each playing code corresponds to one frame of image, and each frame of image is displayed as a normal image or an interference image based on different logic values of the corresponding playing code; and
    the plurality of frames of images is divided into a plurality of consecutive frame groups, and the quantity of consecutive frames of images corresponding to playing codes having an identical logic value in each frame group is not larger than a predetermined value, to enable a user wearing a pair of glasses matching the display screen to see the normal images displayed on the display panel and disenable the user wearing the pair of glasses matching the display screen to see the interference images displayed on the display panel;
    wherein the pair of glasses comprises a switch control circuit, the switch control circuit is configured to control the pair of glasses to switch between a light transmitting state and a light shielding state according to logic values of predetermined playing codes of a plurality of frames of images; and
    the pair of glasses is in the light transmitting state in the case that the display panel displays the normal image and in the light shielding state in the case that the display panel displays the interference image;
    wherein the pair of glasses is provided with one of a locating signal generator and a locating signal receiver, the display screen is provided with the other of the locating signal generator and the locating signal receiver, the locating signal generator and the locating signal receiver are configured, in cooperation, to determine a distance between the pair of glasses and the display panel that is adjustable; and
    wherein the pair of glasses is configured to determine, based on the distance, an M-th row of strip-like electrode, and an N-th row of strip-like electrode of the pair of liquid crystal glasses, and control the M-th row to the N-th row of strip-like electrodes of the pair of liquid crystal glasses to correspond to the first row to the last row of pixels of the liquid crystal display panel, wherein a center line of eyes of the user, a center line of the M-th row of strip-like electrodes, and a center line of the first row of pixels in a row direction are coplanar, and a center line of the eyes of the user, a center line of the N-th row of strip-like electrode, and a center line of the last row of pixels in the row direction are coplanar.

2. The display system according to claim 1, wherein the pair of glasses is a pair of liquid crystal glasses comprising a first substrate, a second substrate and a liquid crystal layer between the first and the second substrates; and
    a plurality of horizontal strip-like electrodes is arranged on the second substrate, and the quantity of the strip-like electrodes is not smaller than the quantity of rows of pixel of the display panel.

3. The display system according to claim 2, wherein the strip-like electrodes are made of a conductive glass.

4. The display system according to claim 2, wherein the quantity of the strip-like electrodes is larger than the quantity of rows of pixel of the display panel.

5. The display system according to claim 1, wherein the switch control circuit is configured to control the pair of glasses to be in the light shielding state when it is detected that a distance between the pair of glasses and the display screen is larger than a predetermined value.

6. The display system according to claim 5, wherein the locating signal generator is an ultrasonic generator and the locating signal receiver is an ultrasonic receiver.

7. A playing method, comprising steps of:
displaying, by a display panel of a display screen, a plurality of frames of image according to a plurality of playing codes that is predetermined, wherein each playing code corresponds to one frame of image, and each frame of image is displayed as a normal image or an interference image based on different logic values of the corresponding playing code; and
controlling a pair of glasses to be in a light transmitting state or a light shielding state according to the logic values of respective playing codes, to enable a user wearing the pair of glasses to see the display screen in the case that the display panel displays the normal image and disenable the user wearing the pair of glasses to see the display screen in the case that the display panel displays the interference image,
wherein the pair of glasses is a pair of liquid crystal glasses, and prior to the step of controlling the pair of glasses to be in the light transmitting state or the light shielding state according to the logic values of the respective playing codes, the method further comprises:
determining a distance between the pair of glasses and the display panel that is adjustable; and
establishing, based on the distance, a correspondence between an M-th row to an N-th row of strip-like electrodes of the pair of liquid crystal glasses and a first row to a last row of pixels of the display panel, wherein a center line of eyes of the user, a center line of the M-th row of strip-like electrodes, and a center line of the first row of pixels in a row direction are coplanar, and a center line of the eyes of the user, a center line of the N-th row of strip-like electrode, and a center line of the last row of pixels in the row direction are coplanar.

8. The method according to claim 7, wherein
the step of controlling the pair of glasses to be in the light transmitting state or the light shielding state according to the logic values of the respective playing codes comprises:
switching on corresponding rows of strip-like electrodes of the pair of liquid crystal glasses based on the logic values of the respective playing codes, wherein the strip-like electrode corresponding to each row of pixels of the display panel is switched on in the case that the display panel displays the normal image and the row of pixels is being scanned.

9. The display system according to claim 1, wherein the playing codes corresponding to any two consecutive frames in each frame group have different logic values.

10. The display system according to claim 1, wherein quantities of frames of images in respective frame groups are identical.

11. The display system according to claim 1, wherein the logic value of each playing code is a binary code.

12. The display system according to claim 1, wherein each frame group corresponds to one frame group code, and each frame group code corresponds to a predetermined sequence of the logic values of the playing codes corresponding to respective frames of images in the frame group corresponding to the frame group code.

13. The display system according to claim 1, wherein the locating signal generator is arranged on the pair of glasses, and the locating signal receiver is arranged on the display panel.

14. The display system according to claim 1, wherein the display control circuit is configured to double a frame frequency of the display panel, when the playing codes corresponding to any two consecutive frames in each frame group have a same logic value.

* * * * *